US012692082B2

(12) United States Patent
Nishikawa

(10) Patent No.: US 12,692,082 B2
(45) Date of Patent: Jul. 28, 2026

(54) TRANSPORT VEHICLE

(71) Applicant: Daifuku Co., Ltd., Osaka (JP)

(72) Inventor: Tadashi Nishikawa, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 179 days.

(21) Appl. No.: 18/809,459

(22) Filed: Aug. 20, 2024

(65) Prior Publication Data

US 2025/0066132 A1     Feb. 27, 2025

(30) Foreign Application Priority Data

Aug. 21, 2023     (JP) ................................. 2023-133963

(51) Int. Cl.
B65G 17/20 (2006.01)
(52) U.S. Cl.
CPC .................................... B65G 17/20 (2013.01)
(58) Field of Classification Search
CPC ........ B65G 17/20; B65G 43/00; B65G 15/30; B65G 35/06; B65G 49/061; B65G 2201/0297; H10P 72/3302; H10P 72/3221
See application file for complete search history.

(56) References Cited

U.S. PATENT DOCUMENTS

| | | | | |
|---|---|---|---|---|
| 9,576,832 | B2 * | 2/2017 | Tomida | .............. H10P 72/3218 |
| 2016/0133488 | A1 | 5/2016 | Tomida | |
| 2017/0341880 | A1 * | 11/2017 | Strobel | ................. B66C 1/0218 |
| 2025/0105042 | A1 * | 3/2025 | Nishikawa | .............. B66C 19/00 |

FOREIGN PATENT DOCUMENTS

| | | | | | |
|---|---|---|---|---|---|
| CN | 113264330 | A | * | 8/2021 | .......... H10P 72/3222 |
| CN | 111246756 | B | * | 10/2023 | ................ H02J 7/84 |
| JP | 201694263 | A | | 5/2016 | |
| KR | 102217233 | B1 | * | 2/2021 | .......... H10P 72/3202 |

* cited by examiner

*Primary Examiner* — Emmanuel M Marcelo

(74) *Attorney, Agent, or Firm* — The Webb Law Firm

(57) ABSTRACT

A transport vehicle includes a holder that holds an article, a lifter that lifts and lowers the holder, a control device, and a power supply unit that receives power from an external source and supplies the power at least to the lifter. The lifter includes a lift drive and a restrictor. The lift drive drives the holder to be lifted and lowered. The restrictor mechanically restricts a lifting and lowering operation of the holder performed by the lift drive. The control device includes a voltage monitor that monitors a target voltage being a voltage applied from the power supply unit to the lift drive. The control device performs a preliminary restriction operation to activate the restrictor in response to the target voltage being lower than or equal to a determination threshold.

3 Claims, 4 Drawing Sheets

TRANSPORT VEHICLE

CROSS-REFERENCE TO RELATED APPLICATION

This application claims priority to Japanese Patent Application No. 2023-133963 filed Aug. 21, 2023, the disclosure of which is hereby incorporated by reference in its entirety.

BACKGROUND

Field of the Invention

The present invention relates to a transport vehicle that transports an article.

Description of Related Art

An example of such a transport vehicle is described in Japanese Unexamined Patent Application Publication No. 2016-94263 (Patent Literature 1). In the background described hereafter, reference signs and names in parentheses are the reference signs and the names in Patent Literature 1.

A ceiling-hung transport vehicle (1) in Patent Literature 1 includes a supporter (23) that supports a transportation object (6) being hung and a lifting assembly (24) that lifts and lowers the supporter (23). The lifting assembly (24) includes a winder (28) that winds a winding belt (24a) and a lifting motor (29) that drives and rotates the winder (28). The winding belt (24a) supports the supporter (23) connected to its distal end. The lifting assembly (24) controls a motor driver to cause the lifting motor (29) to drive and rotate the winder (28) in forward and reverse directions to wind and unwind the winding belt (24a). This causes the supporter (23) to move upward or downward relative to a traveler (16).

In other words, the lifting assembly (24) lifts the transportation object (6) supported by the supporter (23) to a support height by winding the winding belt (24a) to lift a pair of transportation object supports (32) to a lifted height, and lowers the transportation object (6) supported by the supporter (23) to a transfer height by unwinding the winding belt (24a) to lower the pair of transportation object supports (32) to a lowered height.

Control may be performed to keep the supporter (23) and the transportation object (6) at the support height with torque of the lifting motor (29), for example, while the ceiling-hung transport vehicle (1) is traveling. In this case, a power supply abnormality in, for example, a power outage may disable the lifting motor (29) from maintaining its torque, unwinding the winding belt. This may lower the supporter (23), causing the transportation object (6) to fall. To avoid this, the lifting motor or the lifting assembly (24) may include a brake.

However, such a brake operates after a power supply abnormality occurs in, for example, a power outage. Thus, the supporter (23) and the transportation object (6) are to be lowered by a certain degree. The workload in a restoration operation, such as returning the supporter (23) to its original height, is more likely to increase after elimination of the power supply abnormality caused by, for example, a power outage.

SUMMARY OF THE INVENTION

Transport vehicles that have been awaited can reduce the workload in a restoration operation after elimination of a power supply abnormality caused by, for example, a power outage. A technique responding to the above issue provides the structure described below.

A transport vehicle for transporting an article includes a holder that holds the article, a lifter that lifts and lowers the holder, a control device, and a power supply unit that receives power from an external source and supplies the power at least to the lifter. The lifter includes a lift drive and a restrictor. The lift drive drives the holder to be lifted and lowered. The restrictor mechanically restricts a lifting and lowering operation of the holder performed by the lift drive. The control device includes a voltage monitor that monitors a target voltage being a voltage applied from the power supply unit to the lift drive. The control device performs a preliminary restriction operation to activate the restrictor in response to the target voltage being lower than or equal to a determination threshold. The determination threshold is lower than a voltage of the power supply unit in normal operation and higher than a lower limit voltage being a minimum voltage to allow the lift drive to keep the holder at a position in a lifting direction.

In this structure, when the voltage applied to the lift drive drops due to, for example, a power outage or a failure of the power supply unit, the restrictor can mechanically restrict the lifting and lowering operation of the holder before the lift drive fails to keep the holder at a position in the lifting direction due to the voltage drop.

This avoids the holder being lowered unintendedly when, for example, a power outage or a failure of the power supply unit occurs.

Additionally, when the holder is to be returned to its original position in the lifting direction as a restoration process of the transport vehicle, the restoration process takes a reduced workload.

Further features and advantageous effects of the technique according to one or more embodiments of the disclosure will be apparent from exemplary and nonlimiting embodiments described below with reference to the drawings.

DESCRIPTION OF THE INVENTION

1. First Embodiment

A transport vehicle 1 according to a first embodiment will be described with reference to the drawings. The transport vehicle 1 travels along a travel path 10 to transport a container 8 of a predetermined shape. The transport vehicle 1 according to the embodiment described with reference to the drawings is used in an article transport facility 100 and contactlessly receives power from feed lines 12 extending along the travel path 10.

Figure 1:
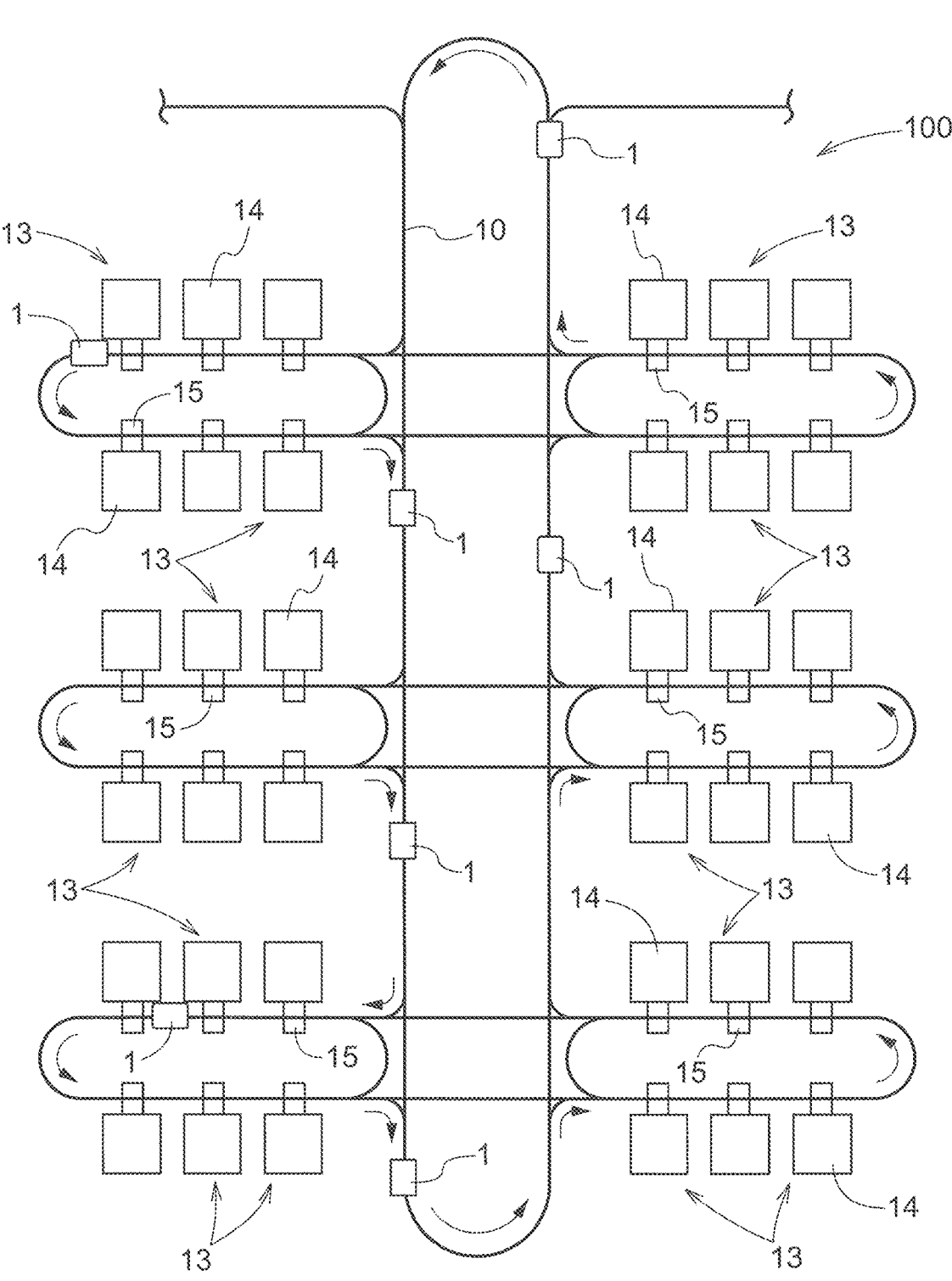
FIG. 1 is a plan view of an article transport facility.

As shown in FIG. 1, the article transport facility 100 includes the travel path 10 that is predefined, one or more transport vehicles 1 that each travel on the travel path 10 to transport the container 8, and multiple transfer areas 13 defined along the travel path 10.

The article transport facility 100 also includes power feeding systems each including the feed lines 12 (refer to FIG. 3) and a power supply (not shown) connected to the feed lines 12 to supply alternating current (AC) to the feed lines 12. The article transport facility 100 supplies driving power to each transport vehicle 1 using wireless power feeding. The feed lines 12 extend along the travel path 10 with a power receiver 60 between the feed lines 12 in a path width direction perpendicular to a path direction parallel to the travel path 10. To avoid decreased efficiency in power transmission or stoppages of the entire facility upon a failure, the article transport facility 100 is to include multiple power feeding systems, rather than one power feeding system.

The travel path 10 is spaced upward from the floor surface. In the present embodiment, the travel path 10 includes rails 11 installed near the ceiling. The transport vehicle 1 is specifically a ceiling-hung transport vehicle 1 and travels along the rails 11. The transfer areas 13 are disposed downward from the travel path 10. The transport vehicle 1 lifts and lowers the container 8 and transfers the container 8 to and from a transfer area 13.

In the present embodiment, the article transport facility 100 includes multiple transport vehicles 1. Each of the multiple transport vehicles 1 performs, in response to a transport command provided from a host control device (not shown) that centrally manages the facility, a task corresponding to the transport command. For example, the transport command includes information about a transfer source and a transfer destination of a container 8. A transport vehicle 1 receives such a transport command and transports the container 8 from its transfer source to its transfer destination. The transfer source and the transfer destination include transfer areas 13.

The article transport facility 100 handles various containers 8. In the present embodiment, the article transport facility 100 is used in a semiconductor fabrication plant. The containers 8 are thus, for example, substrate containers 8 (front opening unified pods, or FOUPs) containing substrates (e.g., wafers and panels) or reticle containers 8 (reticle pods) containing reticles. In this case, the transport vehicles 1 transport, between processes, the containers 8 such as the substrate containers 8 or the reticle containers 8 along the travel path 10.

In the present embodiment, each transfer area 13 includes a processing device 14 that processes a container 8 and a mount 15 adjacent to the processing device 14. Processing a container 8 herein refers to processing objects (substrates or reticles) contained in the container 8. Each transport vehicle 1 receives a container 8 that has been processed by the processing device 14 from the mount 15 or delivers a container 8 that has yet to be processed by the processing device 14 to the mount 15. The processing devices 14 perform various processes such as thin film formation, photolithography, and etching.

Figure 2:
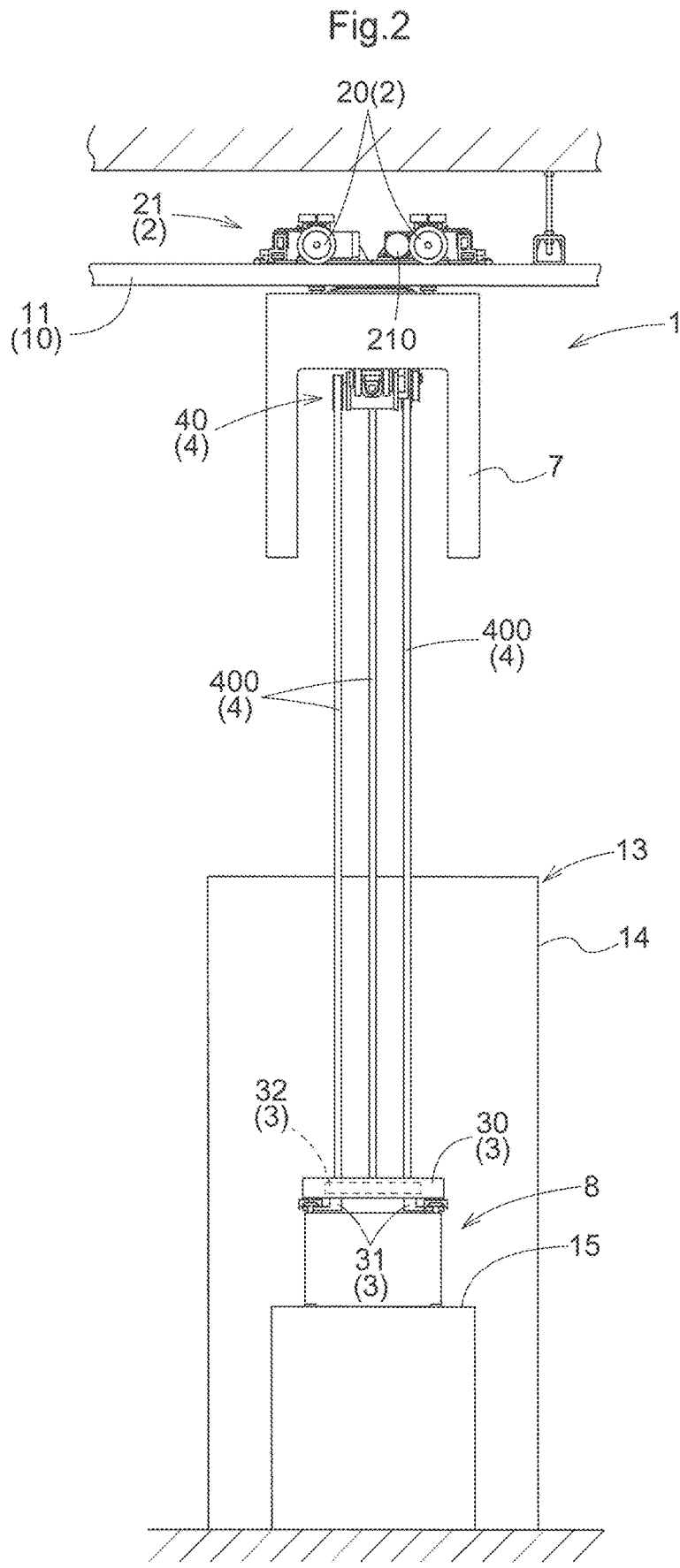
FIG. 2 is a diagram describing a transfer operation.
Figure 3:
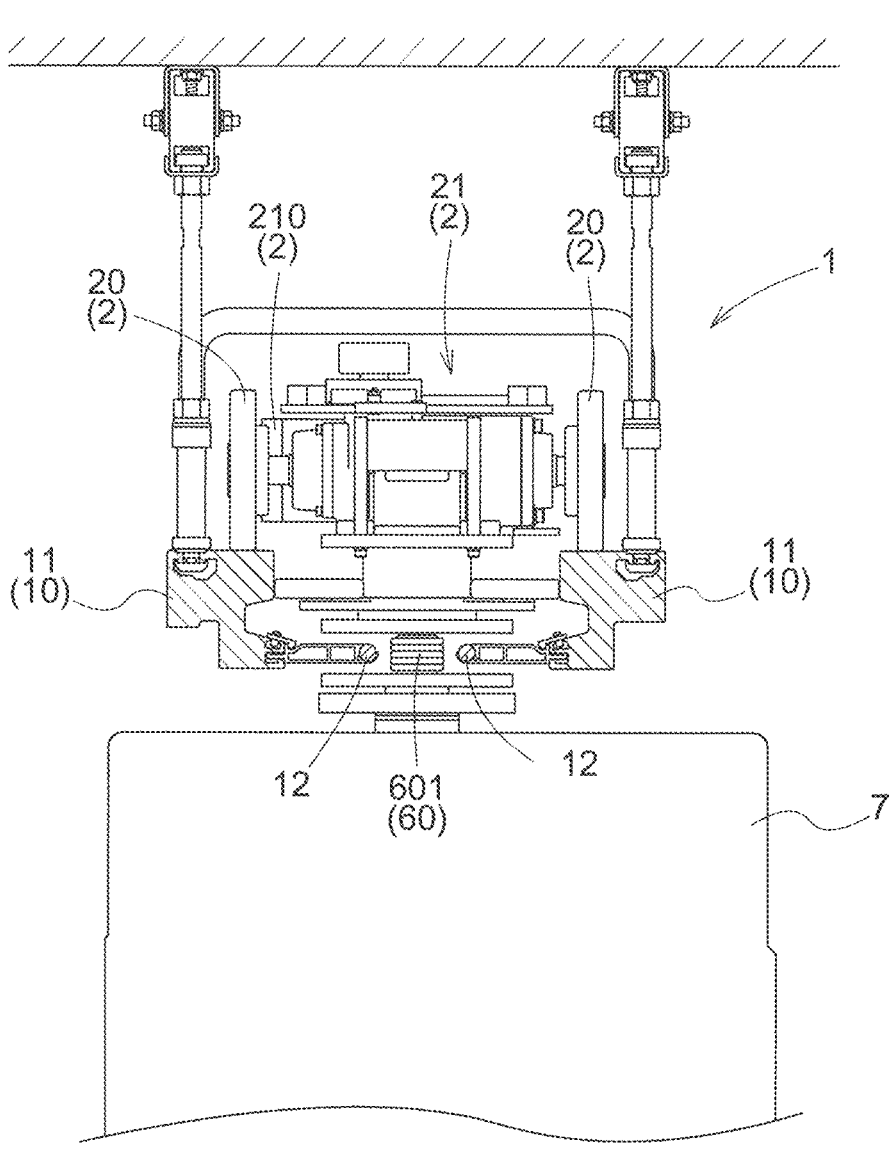
FIG. 3 is a front view of a transport vehicle.

As shown in FIGS. 2 and 3, each transport vehicle 1 includes a traveler 2 that travels on the rails 11 and a compartment 7 that accommodates a container 8 (article). The transport vehicle 1 includes a holder 3 that holds the container 8, a lifter 4 that lifts and lowers the holder 3, a control device 5 (refer to FIG. 4), and a power supply unit 6 that receives power from an external source and supplies power at least to the lifter 4. The holder 3 that holds an article and the lifter 4 that lifts and lowers the holder 3 are disposed in the compartment 7.

The traveler 2 travels on the rails 11 to move the entire transport vehicle 1 along the travel path 10. In the present embodiment, the traveler 2 includes multiple travel wheels 20 that roll on the rails 11 and a travel drive 21 that drives at least one or more of the multiple travel wheels 20. The travel drive 21 includes a travel drive motor 210 (e.g., a servomotor) and a driver 211 (drive circuit) that controls the travel drive motor 210.

Figure 4:
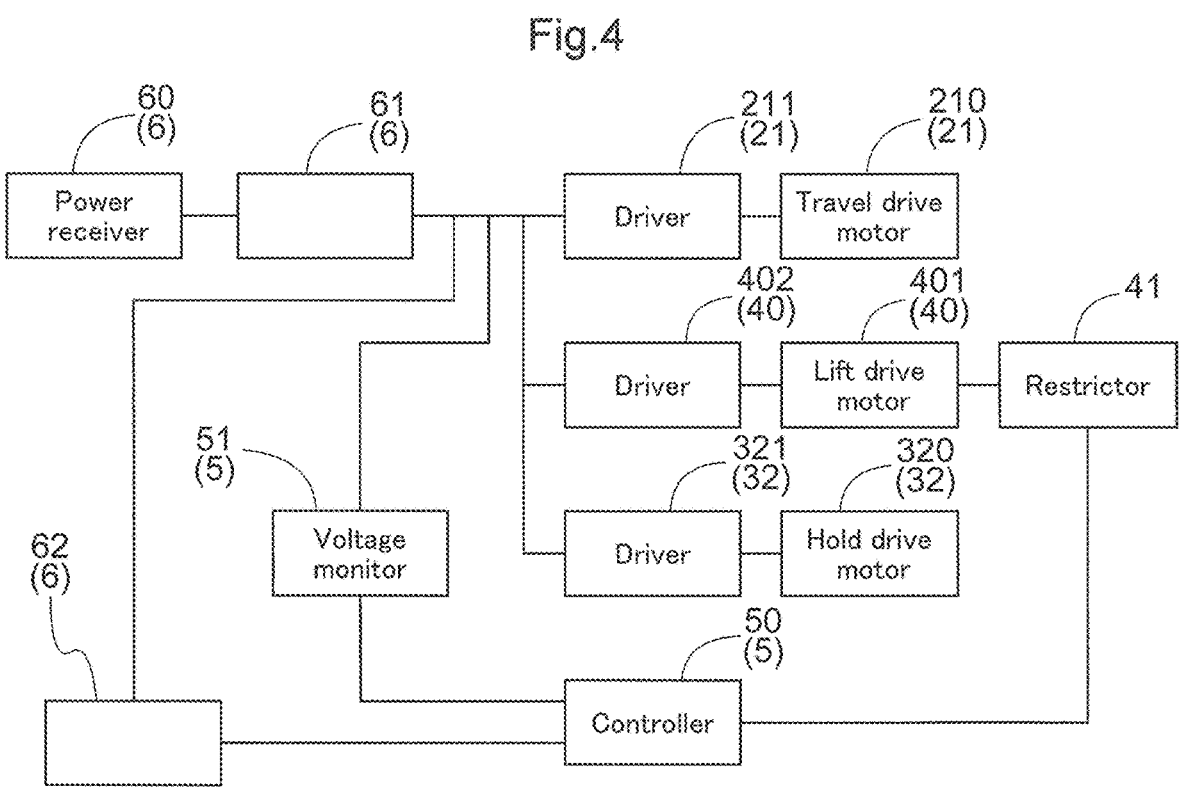
FIG. 4 is a block diagram of the transport vehicle showing its control configuration.

As shown in FIG. 4, the power supply unit 6 in the present embodiment includes the power receiver 60 that receives power from the power feeding systems, a rectifier circuit 61 (e.g., a power supply board, or PSB) for conversion to direct current (DC), and a DC-DC converter 62 for voltage adjustment. The power supply unit 6 uses these components to supply power to various components in the transport vehicle 1.

The power receiver 60 includes, for example, a pickup coil 601 (refer to FIG. 3) disposed in the transport vehicle 1 to face the feed lines 12, and a power receiving unit (not shown) on a wiring board in the transport vehicle 1.

When a power feeding system feeds a high-frequency current to its feed lines 12 as induction lines and generates magnetic fields around the feed lines 12, the pickup coil 601 in the power receiver 60 generates an induced electromotive force using the AC flowing through the feed lines 12. In other words, power for driving the traveler 2, the lifter 4, the holder 3, and the control device 5 is supplied contactlessly from the feed lines 12 to the power receiver 60 in the power supply unit 6. In the present embodiment, the power supply unit 6 supplies power to the traveler 2, the lifter 4, the holder 3, and the control device 5. In some embodiments, the power supply unit 6 may supply power at least to the lifter 4, and another power supply may supply power to the traveler 2, the holder 3, and the control device 5.

As shown in FIG. 2, the holder 3 is vertically movable and supports an article being hung. The holder 3 is disposed in the compartment 7.

The holder 3 can hold a container 8. The holder 3 includes a holder body 30 hung from the lifter 4, a pair of holding members 31 supported by the holder body 30, and a hold drive 32 that drives the pair of holding members 31. The hold drive 32 includes a hold drive motor 320 (e.g., a servomotor) and a driver 321 (drive circuit) that controls the hold drive motor 320.

Although the holder 3 in the present embodiment uses a chuck unit that holds the container 8 by engaging the pair of holding members 31 with handles (not shown) on the container 8, the holder 3 may have another structure. The holder 3 with another structure may include, for example, a fork transfer unit including a fork that supports the container 8 and is advanced and retracted. The fork herein refers to a component that supports a support target and is advanced and retracted by an advancement and retraction device. The fork may have any shape.

As shown in FIG. 4, the lifter 4 includes a lift drive 40 that drives the holder 3 to be lifted and lowered and a restrictor 41 that mechanically restricts the lifting and lowering operation of the holder 3 performed by the lift drive 40. The lift drive 40 includes a rotator, lifting belts 400 (examples of a wound member) on the rotator in a manner windable on and unwindable from the rotator, a lift drive motor 401 (e.g., a servomotor) that drives the rotator to rotate, and a driver 402 (drive circuit) that controls the lift drive motor 401.

The rotator in the present embodiment refers to a component that winds a wound member. Examples of the rotator include a known rotating drum. Although the lifting belts are examples of the wound member, the wound member may be any component that can be wound on the rotator in the lifter 4, such as a wire.

The lift drive motor 401 includes the restrictor 41 that mechanically restricts the lifting and lowering operation of the holder 3. The restrictor 41 can perform both a restriction operation and a restriction release operation. Examples of the restrictor 41 include a brake for holding the lift drive motor.

As shown in FIG. 2, the lifter 4 lifts and lowers the holder 3 between the compartment 7 and a transfer area 13 disposed downward from the travel path 10. The lifting belts 400 are connected to the holder 3. The lifting belts 400 hanging the holder 3 are unwound from the rotator to lower the holder 3, and wound on the rotator to lift the holder 3.

The compartment 7 can accommodate a container 8 to be transported. In the present embodiment, the compartment 7 is hung from and supported by the traveler 2 and disposed downward from the rails 11. The compartment 7 can accommodate the container 8 held by the holder 3. When the transport vehicle 1 transports the container 8 along the travel path 10, the container 8 is accommodated in the compartment 7.

As shown in FIG. 4, the control device 5 includes a controller 50 that controls the overall operation of the transport vehicle 1 and a voltage monitor 51 that monitors a target voltage. The controller 50 may be, for example, an object linking and embedding process control (OPC) board. The controller 50 may control the lifter 4 alone, rather than controlling the overall operation of the transport vehicle 1. The target voltage in the present embodiment refers to the voltage applied from the power supply unit 6 to the lift drive 40.

Each transport vehicle 1 switches between multiple power feeding systems to continuously receive power and travel freely in the article transport facility 100. The article transport facility 100 includes a host control device (not shown) that transmits a transport command to the control device 5 in each transport vehicle 1 to transport articles.

Each transport vehicle 1 travels autonomously based on the transport command. For example, in a predetermined transfer area 13 (e.g., a storage) for, for example, storing semiconductor substrates, the transport vehicle 1 lowers, with the lifter 4, the holder 3 to hold a container 8 to be transported and then lifts the holder 3 to accommodate the container 8 in the compartment 7. The transport vehicle 1 then moves along the travel path 10 to another predetermined transfer area 13, and lowers, with the lifter 4, the holder 3 to unload the accommodated container 8. In this manner, each transport vehicle 1 transports an article between predetermined transfer areas 13. The host control device selects transport vehicles 1 appropriately for a transfer source and a transfer destination and transmits transport commands to the selected transport vehicles 1 to allow each power feeding system to supply power to a predetermined number of transport vehicles 1 or fewer.

In the transport vehicle 1 according to one or more embodiments of the present invention, the voltage applied from the power supply unit 6 to the lift drive 40 is set as the target voltage, and the lower limit voltage being a minimum voltage to allow the lift drive 40 to keep the holder 3 at a position in a lifting direction is set as a lower limit voltage. More specifically, the lower limit voltage refers to both a voltage value to prevent the lift drive 40 from keeping the holder 3 at a position in the lifting direction due to an error in the driver 402 controlling the lift drive motor 401 and a voltage value to cause insufficient power and thus insufficient torque of the lift drive motor 401.

As shown in FIG. 4, the control device 5 includes the voltage monitor 51 that monitors the target voltage as described above. When the voltage monitor 51 detects the target voltage lower than or equal to a determination threshold, the controller 50 performs a preliminary restriction operation (an operation to mechanically restrict the lifting and lowering operation) to activate the restrictor 41 in the lift drive motor 401. The determination threshold is set to be lower than the voltage of the power supply unit 6 in normal operation (this voltage is referred to as a normal voltage) and higher than the lower limit voltage. For example, when the target voltage is lower than or equal to 250 V with the normal voltage being 320 V, the lower limit voltage being 200 V, and the determination threshold being set to 250 V, the controller 50 activates the restrictor 41 to stop the lift drive motor 401 and thus prevents the holder 3 from being lowered unintendedly. For a range of normal voltages, the lower limit voltage value is used.

The power supply unit 6 may include a power storage that temporarily stores power, and the voltage of the power storage may be provided to the lift drive 40. In the present embodiment, the power supply unit 6 includes the power storage to supplement any insufficiency of power when the rectifier circuit 61 (e.g., PSB) for conversion to DC is momentarily short of power while the transport vehicle 1 is traveling or performing the lifting and lowering operation. Examples of the power storage include a capacitor (e.g., a regenerative charging capacitor) and a small storage battery.

For the controller 50 that keeps the holder 3 at a position in the lifting direction and that performs a position keeping operation to keep the holder 3 at a position in the lifting direction by controlling the driving force of the lift drive motor 401 when the target voltage is higher than the determination threshold, the lower limit voltage is a lower limit voltage to allow the position keeping operation to be performed with the lift drive motor 401 or a voltage to allow the driver 402 for the lift drive motor 401 to operate normally.

Each transport vehicle 1 may include, on, for example, the compartment 7, an article height detection sensor that detects the holder 3 or a container 8 held by the holder 3 at a position lower than a predetermined reference height in the lifting direction. In this case, while the article height detection sensor is performing detection, the transport vehicle 1 cannot return to its normal operation mode unless the container 8 is returned to a normal position. Thus, for a known transport vehicle, restoration of the height of the container 8 is to be performed.

In the structure according to the present embodiment, the restrictor 41 can mechanically restrict the lifting and lowering operation of the holder 3 before the lift drive 40 fails to keep the holder 3 at a position in the lifting direction due to a drop in the voltage applied to the lift drive 40, or in other words, before the holder 3 is lowered and the container 8 reaches a position lower than the predetermined reference height in the lifting direction. This avoids the holder 3 being lowered unintendedly when, for example, a power outage or a failure of the power supply unit 6 occurs, and the container 8 is kept at the predetermined reference height in the lifting direction. The article height detection sensor thus does not perform detection, and thus, restoration of the height of the container 8 is not to be performed.

2. Second Embodiment

Figure 5:
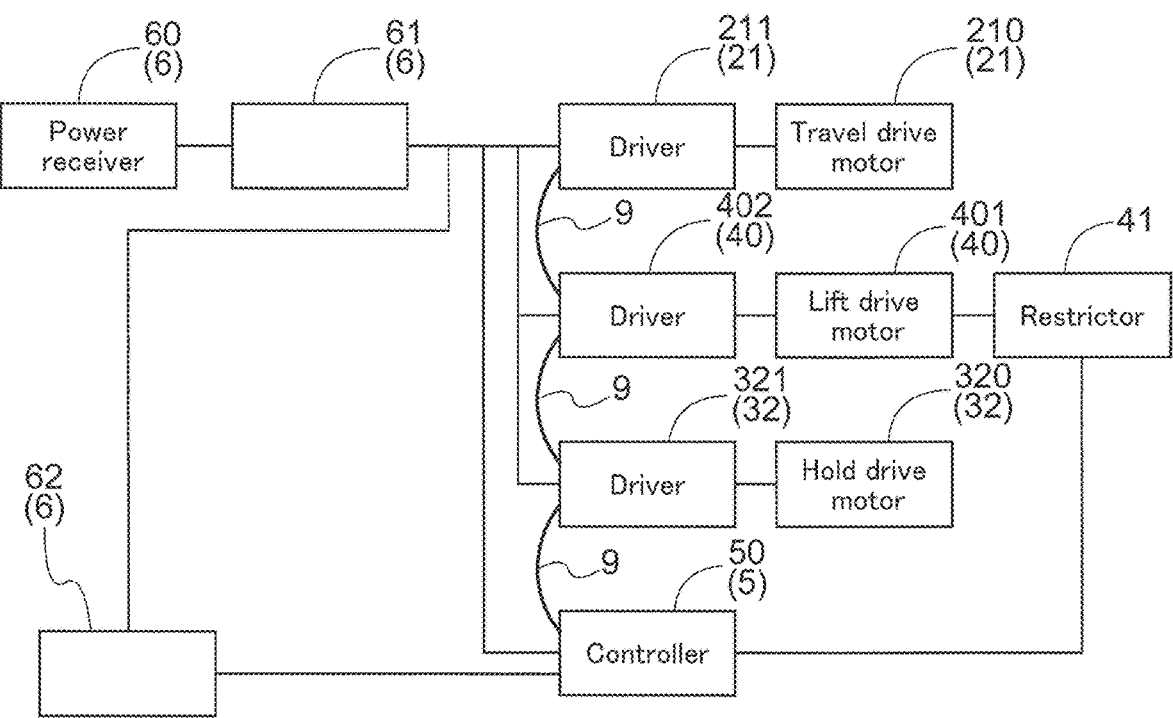
FIG. 5 is a block diagram of a transport vehicle according to a second embodiment, showing its control configuration.

A transport vehicle 1 according to a second embodiment will now be described with reference to FIG. 5. The present embodiment differs from the first embodiment in that the controller 50 that controls the overall operation of the transport vehicle 1 and the voltage monitor 51 that monitors the target voltage are integral with each other. The transport vehicle 1 according to the present embodiment will be described below focusing on the differences from the first embodiment. The components not described below are the same as those in the first embodiment.

In the first embodiment, the controller 50 that controls the overall operation of the transport vehicle 1 and the voltage monitor 51 that monitors the target voltage are separate from each other. In the present embodiment, the controller 50 controls the overall operation of the transport vehicle 1 and also monitors the target voltage.

In the present embodiment, the controller 50 is connected to the driver 211 for the travel drive motor 210, the driver 402 for the lift drive motor 401, and the driver 321 for the hold drive motor 320 through a local area network (LAN 9) and monitors the voltages of the drivers 211, 321, and 402 through the LAN 9. When the controller 50 detects the target voltage lower than or equal to the determination threshold, the controller 50 performs the preliminary restriction operation to activate the restrictor 41 in the lift drive motor 401.

The structure described in each of the above embodiments may be combined with any other structures described in the other embodiments unless any contradiction arises. The embodiments described herein are merely illustrative in all aspects and may be modified variously as appropriate without departing from the spirit and scope of the disclosure.

3. Overview of Embodiments

The embodiments of the transport vehicle described above are overviewed below.

The transport vehicle is a transport vehicle for transporting an article. The transport vehicle includes a holder that holds the article, a lifter that lifts and lowers the holder, a control device, and a power supply unit that receives power from an external source and supplies the power at least to the lifter. The lifter includes a lift drive and a restrictor. The lift drive drives the holder to be lifted and lowered. The restrictor mechanically restricts a lifting and lowering operation of the holder performed by the lift drive. The control device includes a voltage monitor that monitors a target voltage being a voltage applied from the power supply unit to the lift drive.

The control device performs a preliminary restriction operation to activate the restrictor in response to the target voltage being lower than or equal to a determination threshold. The determination threshold is lower than a voltage of the power supply unit in normal operation and higher than a lower limit voltage being a minimum voltage to allow the lift drive to keep the holder at a position in a lifting direction.

In this structure, when the voltage applied to the lift drive drops due to, for example, a power outage or a failure of the power supply unit, the restrictor can mechanically restrict the lifting and lowering operation of the holder before the lift drive fails to keep the holder at a position in the lifting direction due to the voltage drop. This avoids the holder being lowered unintendedly when, for example, a power outage or a failure of the power supply unit occurs. Additionally, when the holder is to be returned to its original position in the lifting direction as a restoration process of the transport vehicle, the restoration process takes a reduced workload.

The power supply unit may include a power storage that stores power temporarily. A voltage of the power storage may be applied to the lift drive.

In this structure, the power storage can supplement any momentary insufficiency of power resulting from a power outage or a failure of the power supply unit, thus avoiding a sudden drop in the voltage applied to the lift drive. This increases the reliability of the control device for performing the preliminary restriction operation.

The lift drive may include a rotator, a wound member on the rotator in a manner windable on and unwindable from the rotator, and a lift drive motor that drives the rotator to rotate. The lift drive may lower the holder hung from the wound member by unwinding the wound member from the rotator and lift the holder by winding the wound member on the rotator. The lift drive motor may be a servomotor. The control device may perform a position keeping operation to keep the holder at a position in the lifting direction by controlling a driving force of the lift drive motor when the holder is to be kept at the position in the lifting direction in response to the target voltage being higher than the determination threshold. The lower limit voltage may be a lower limit voltage to allow the position keeping operation to be performed with the lift drive motor or a voltage to allow a driver for the lift drive motor to operate normally.

In this structure, when the voltage applied from the power supply unit to the lift drive is normal, the position keeping operation of the holder in the lifting direction is performed by controlling the driving force of the lift drive motor. Thus, the restrictor is not to perform a switching operation between restriction and restriction release frequently, facilitating the lifting and lowering operation of the holder to be performed promptly. When the voltage applied to the lift drive drops due to, for example, a power outage or a failure of the power supply unit, the position keeping operation, which is performed by controlling the driving force of the lift drive motor, may not be performed appropriately. However, in this structure, the restrictor can mechanically restrict the lifting and lowering operation of the holder before the lift drive fails to keep the holder at a position in the lifting direction due to the drop in the voltage applied to the lift drive, as described above. This avoids the holder being lowered unintendedly when, for example, a power outage or a failure of the power supply unit occurs.

INDUSTRIAL APPLICABILITY

The technique according to one or more embodiments of the disclosure is applicable to a transport vehicle that travels along a travel path to transport an article.

What is claimed is:

1. A transport vehicle for transporting an article, the transport vehicle comprising:
    a holder configured to hold the article;
    a lifter configured to lift and lower the holder;
    a control device; and
    a power supply unit configured to receive power from an external source and supply the power at least to the lifter, and
    wherein:
    the lifter comprises a lift drive and a restrictor, the lift drive is configured to drive the holder to be lifted and lowered, and the restrictor is configured to mechanically restrict a lifting and lowering operation of the holder performed by the lift drive, and
    the control device comprises a voltage monitor configured to monitor a target voltage being a voltage applied from the power supply unit to the lift drive, the control device is configured to perform a preliminary restriction operation to activate the restrictor in response to the target voltage being lower than or equal to a determination threshold, and the determination threshold is lower than a voltage of the power supply unit in normal operation and higher than a lower limit voltage being a minimum voltage to allow the lift drive to keep the holder at a position in a lifting direction.

2. The transport vehicle according to claim 1, wherein:

the power supply unit comprises a power storage configured to store power temporarily, and a voltage of the power storage is applied to the lift drive.

3. The transport vehicle according to claim 1, wherein:

the lift drive comprises a rotator, a wound member on the rotator in a manner windable on and unwindable from the rotator, and a lift drive motor configured to drive the rotator to rotate, the lift drive lowers the holder hung from the wound member by unwinding the wound member from the rotator and lifts the holder by winding the wound member on the rotator, the lift drive motor is a servomotor, the control device performs a position keeping operation to keep the holder at a position in the lifting direction by controlling a driving force of the lift drive motor when the holder is to be kept at the position in the lifting direction in response to the target voltage being higher than the determination threshold, and the lower limit voltage is a lower limit voltage to allow the position keeping operation to be performed with the lift drive motor or a voltage to allow a driver for the lift drive motor to operate normally.

* * * * *